J. J. BRENT.
AUTOMOBILE HEATER.
APPLICATION FILED OCT. 2, 1914.
1,213,069.
Patented Jan. 16, 1917.
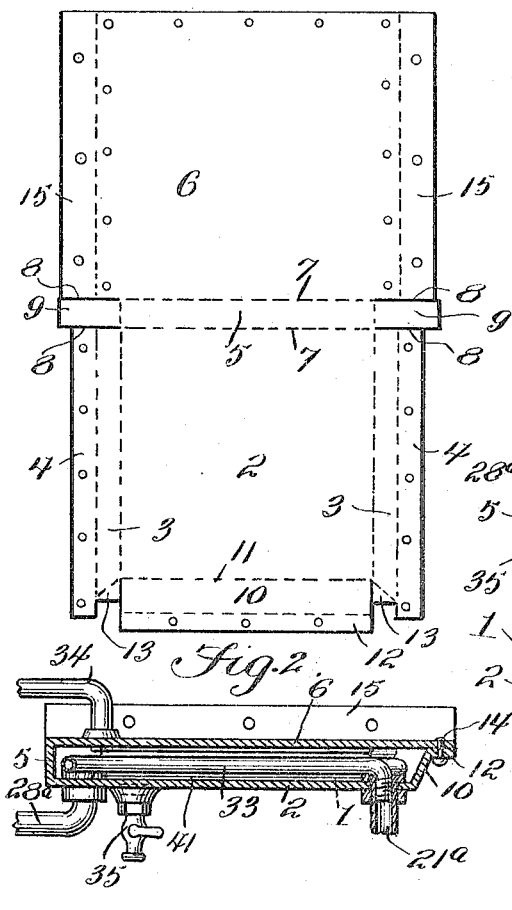
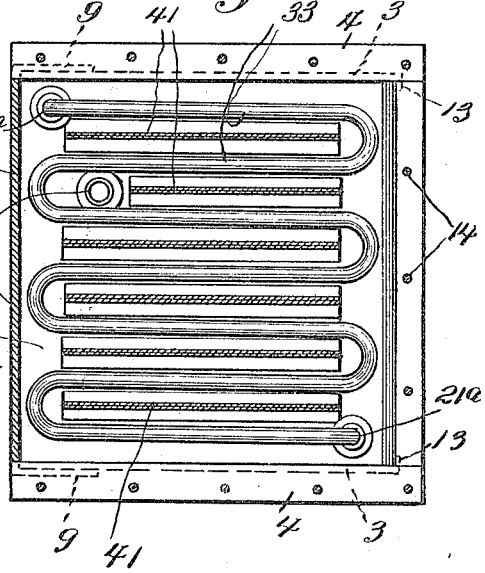
Inventor
J. J. Brent
By Victor J. Evans
Attorney

UNITED STATES PATENT OFFICE.

JOHN J. BRENT, OF ALTON, KANSAS.

AUTOMOBILE-HEATER.

1,213,069.        Specification of Letters Patent.      Patented Jan. 16, 1917.

Application filed October 2, 1914. Serial No. 864,664.

*To all whom it may concern:*

Be it known that I, JOHN J. BRENT, a citizen of the United States, residing at Alton, in the county of Osborne and State of Kansas, have invented new and useful Improvements in Automobile-Heaters, of which the following is a specification.

This invention is an improved automobile heater for use in an automobile and to utilize the heat of the exhaust gases from the engine in heating the body of the automobile and keeping its occupants comfortable in cold weather, the object of the invention being to provide an improved automobile heater of this character which is extremely cheap and simple, which may be readily installed, which may be made of any suitable material, which is thoroughly efficient in operation, costs nothing to maintain and which is not liable to get out of order.

With the above and other objects in view, the invention consists in the construction, combination and arrangement of devices hereinafter described and claimed.

In the accompanying drawings:—Figure 1 is a detail plan of the blank from which the casing or body of the heater is formed. Fig. 2 is a vertical longitudinal sectional view of the same, and Fig. 3 is a horizontal sectional view of the same.

The body or casing 1 of my improved heater for automobiles may be made of any suitable material, such for instance as sheet or plate metal and is formed in a single piece. In Fig. 1 of the drawing, I show a blank from which the casing is made. The bottom 2 is formed with side walls 3 adapted to be bent upwardly therefrom and the side walls are formed with flanges 4 to extend outwardly therefrom when the casing is set up. The rear wall 5 connects the bottom with the top 6, is bent on the lines 7, and is cut on the lines 8 to form tongues 9 which are bent against the outer sides and secured to the side walls 3 as indicated in Fig. 3. The front wall 10 is bent from the bottom on the line 11 and is formed with a flange 12 bent forwardly therefrom. The side walls 3 are formed with tongues 13 at their front ends which are bent against and secured to the front wall as at Fig. 3. The top 6 is turned forwardly and arranged in a horizontal position to bear on the flanges 4 and 12 and is secured to said flanges by rivets 14 or by other suitable means as may be desired and the top is formed at its sides with flanges 15 which are turned upwardly to vertical position and adapted to bear against the side walls of the body of an automobile or other device.

A heater formed in this way from a single blank of sheet metal will be found to be light and strong and to afford a better heating surface to warm the feet of the occupants of the automobile. Any suitable type of heating conveying pipes is adapted to be secured, in any desirable manner, within this heater, but forming no part of my present invention I will dispense with a description of the same.

I claim:—

A device of the class described consisting of an oblong metal sheet, said sheet being provided with longitudinally separated integral parts forming respectively a rectangular top portion, a relatively narrow rear wall integral with said top portion, a bottom portion integral with said back wall and a front portion integral with said bottom portion, said bottom portion being rectangular but of a smaller size relatively to the top portion, said rear wall being of the same width as said bottom portion, said front wall terminating in a forwardly bent flange disposed parallel with the bottom portion, the outer end of said top portion contacting with and being secured upon said flange, said bottom portion being also formed with lateral extensions, said rear wall having opposite extensions forming tongues slit with respect to the bottom and top portion, each of the extensions of said bottom portion being bent upwardly to provide side walls at right angles to the bottom portion and having right angular flanges upon which are secured the opposite side edges of the top portion, said tongues being bent around so as to lap over the side walls, said side walls having end tongues at right angles to the first-named tongue and lapping over said front wall.

In testimony whereof I affix my signature in presence of two witnesses.

JOHN J. BRENT.

Witnesses:
    J. W. GARNER,
    E. EDMONSTON, Jr.

Copies of this patent may be obtained for five cents each, by addressing the "Commissioner of Patents, Washington, D. C."